United States Patent [19]

Giberson et al.

[11] Patent Number: 4,867,006

[45] Date of Patent: Sep. 19, 1989

[54] ROTATING SHAFT MOUNTED ACTUATING MECHANISM

[76] Inventors: Melbourne F. Giberson, 5 Spring Mill La., Haverford, Pa. 19041; Richard P. Lindgren, P.O. Box 492, Chester Springs, Pa. 19425

[21] Appl. No.: 41,298

[22] Filed: Apr. 22, 1987

[51] Int. Cl.⁴ ............................................ F16F 15/22
[52] U.S. Cl. .................................. 74/573 R; 74/574; 416/500
[58] Field of Search ...................... 74/571, 573 R, 600, 74/601, 768; 474/23; 416/152, 144, 145, 500 X; 464/180; 415/119

[56] References Cited

U.S. PATENT DOCUMENTS

| | | | |
|---|---|---|---|
| 3,151,066 | 9/1964 | Brenner et al. | 74/573 X |
| 3,581,586 | 6/1971 | Wespi | 74/573 |
| 3,776,065 | 12/1973 | Unno et al. | 74/573 |
| 3,964,342 | 6/1976 | Beam et al. | 416/152 X |
| 4,117,742 | 10/1978 | Stein | 74/573 F X |
| 4,177,692 | 12/1979 | Irwin | 74/573 R |
| 4,455,887 | 6/1984 | Lissajoux et al. | 74/573 R |

*Primary Examiner*—Richard E. Moore
*Assistant Examiner*—Vinh Luong
*Attorney, Agent, or Firm*—Polster, Polster and Lucchesi

[57] ABSTRACT

An actuating mechanism installed intermediate the ends of a shaft without access to an end of the shaft is operative to perform a function requiring motion while the shaft is rotating. It includes a split hub mounted on and around the shaft, split ring gears carried by the hub but freely rotatable with resepct thereto, a pinion mounted to be rotated by and to engage the teeth of both ring gears, a drive train operated by the pinion, and preferably electro-magnetic brakes for selectively slowing one of the ring gears with respect to the other without engaging the ring gear, to cause the pinion to rotate.

In the embodiments illustrated and described, the pinion is operatively connected to a weight movable with respect to the shaft to permit balancing of the shaft while the shaft is rotating.

16 Claims, 10 Drawing Sheets

ROTATING SHAFT MOUNTED ACTUATING MECHANISM

BACKGROUND OF THE INVENTION

The primary application of this invention is in balancing a rotating shaft assembly, such as is found in multi-stage turbo generators, for example, but the invention has application to other machinery.

By way of illustration, in a steam turbine driven generating station, during the start up after initial assembly or after any reassembly, the train of drive shafts often requires balancing. During normal operation, erosion of the blading, unsymmetrical coating of the blading or distortion of various components of the turbines makes it necessary to rebalance the assembly. Presently, the machinery is shut down, and a balance weight added which is usually conservatively calculated to reduce the vibrations at the point along the shaft having the highest vibrations without increasing the vibrations at other axial locations significantly. However, due to the non-linear stiffness characteristics inherent in fluid film bearings, which are commonly used in most of this machinery, the relationship between angular location of the peak vibration and the angular location of a corrective balance weight is not precisely known, and the relationship between the vibration amplitude and the magnitude of the corrective weight is not precisely known. Thus, in most applications of multi-bearing trains of rotating machinery, there is substantial risk that a balance weight may not reduce the vibrations as expected, even with the most sophisticated vibration data gathering instrumentation and balance weight calculation programs presently available. This is due to the extreme complexity of the mechanical structure of the rotating trains, and has very little to do with the vibration data gathering systems or the balance weight calculation procedures. The present way to balance these units is to start up the unit, measure and record the vibration data at all speeds and loads considered significant, load up the unit, shut down the unit, calculate a new balance weight or set of balance weights, install the weights with the machine stopped, restart the unit, measure the vibrations, and repeat the process until the vibrations are considered satisfactory. It can be appreciated that starting up and shutting down a major generator is a costly and complicated process. The desirability of balancing a rotating member while it is rotating has long been recognized. The art as applied to grinding wheels is well developed. However, the apparatus for accomplishing the balancing of grinding wheels has been very complicated, and has been predicated on the fact that the balancing apparatus can be either mounted on the wheel itself or on a stub shaft, generally made hollow to receive a control rod in which, because it extends through and along the axis of rotation, can either be moved axially or held against rotation to actuate a balancing mechanism. U.S. Pat. Nos. illustrating this approach include: Lehman, 4,474,076, Kida et al., 3,918,326, Dahlin, 4,041,802, Kurkowski et al 3,952,612, Kimmelaar 3,866,489, Liebmann et al., 3,827,193, Vetter, 3,822,514, Ito, 3,698,263, Held, 3,376,759, and Achilles, 3,177,738.

The teachings of this art are not applicable to the balancing of a drive train that extends uninterruptedly between successive pieces of equipment, and, as has been indicated, no balancing apparatus capable of operation while the shafts are rotating has been put into commercial operation in power plants and pumping stations and the like, to the knowledge of the applicants.

One of the objects of this invention is to provide an actuating mechanism that can be installed on a shaft intermediate its ends without access to one end, and be operated, without access to an end of the shaft, while the shaft is rotating.

Another object is to provide such a device that is simple, highly dependable and rugged, and which permits fine adjustment.

Other objects will become apparent to those skilled in the ar in the light of the following description and accompanying drawings.

SUMMARY OF THE INVENTION

In accordance with this invention, generally stated, an actuating mechanism is provided that is adapted to be installed intermediate the ends of a shaft and operates to perform a function requiring motion while the shaft is rotating. It includes a split hub mounted on and around the shaft intermediate the ends thereof. The hub supports one or more pairs of ring gears, concentric with the shaft but rotatable freely with respect to the shaft and hub. Pairs of the ring gears have teeth on generally radially extending surfaces, the gears of each pair being spaced apart and the teeth facing one another. The teeth are engaged by a pinion which is connected by a power train to an actuator adapted to move in either of two directions, depending upon the direction of rotation of the pinion. A brake mechanism, preferably one that does not engage the ring gears directly, is selectively actuatable to slow one of the ring gears of the pair with respect to the other of the ring gears, thereby causing it to rotate. The direction of rotation of the pinion depends upon which of the ring gears is slowed.

DESCRIPTION OF THE PREFERRED EMBODIMENT

Figure 1:
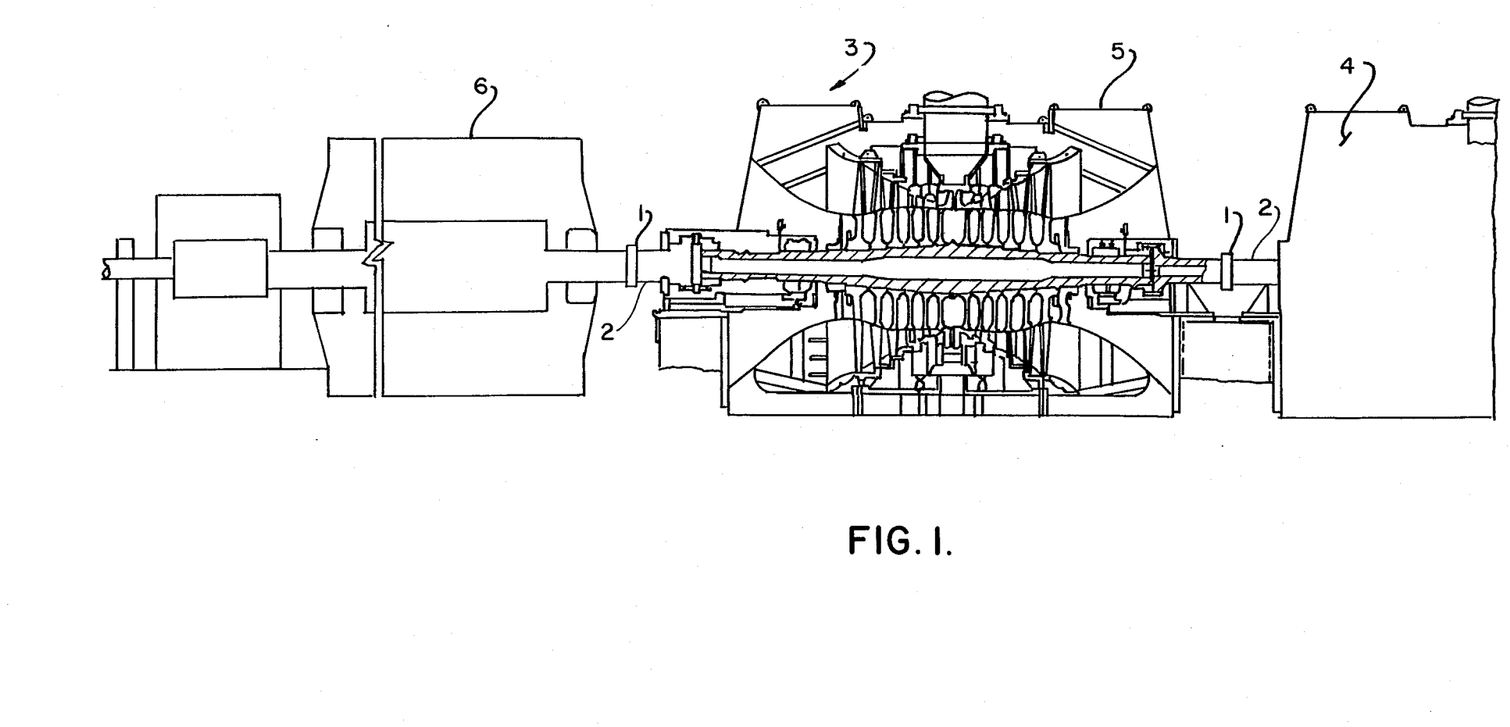
FIG. 1 is a view in side elevation, partly broken away, diagramatic in nature, showing two stages of a multistage turbine driven generator, to which the mechanism of this invention has application.

Referring now to the FIG. 1, reference numeral 1 indicates actuating mechanisms of this invention, in this illustration, balancing mechanisms, mounted on two reaches of shafting 2 between units of a multi-stage turbine driven generator 3. One of the mechanisms 1 is mounted between stages 4 and 5 of a steam turbine, and the other between the stage 5 and a generator 6.

Figure 2:
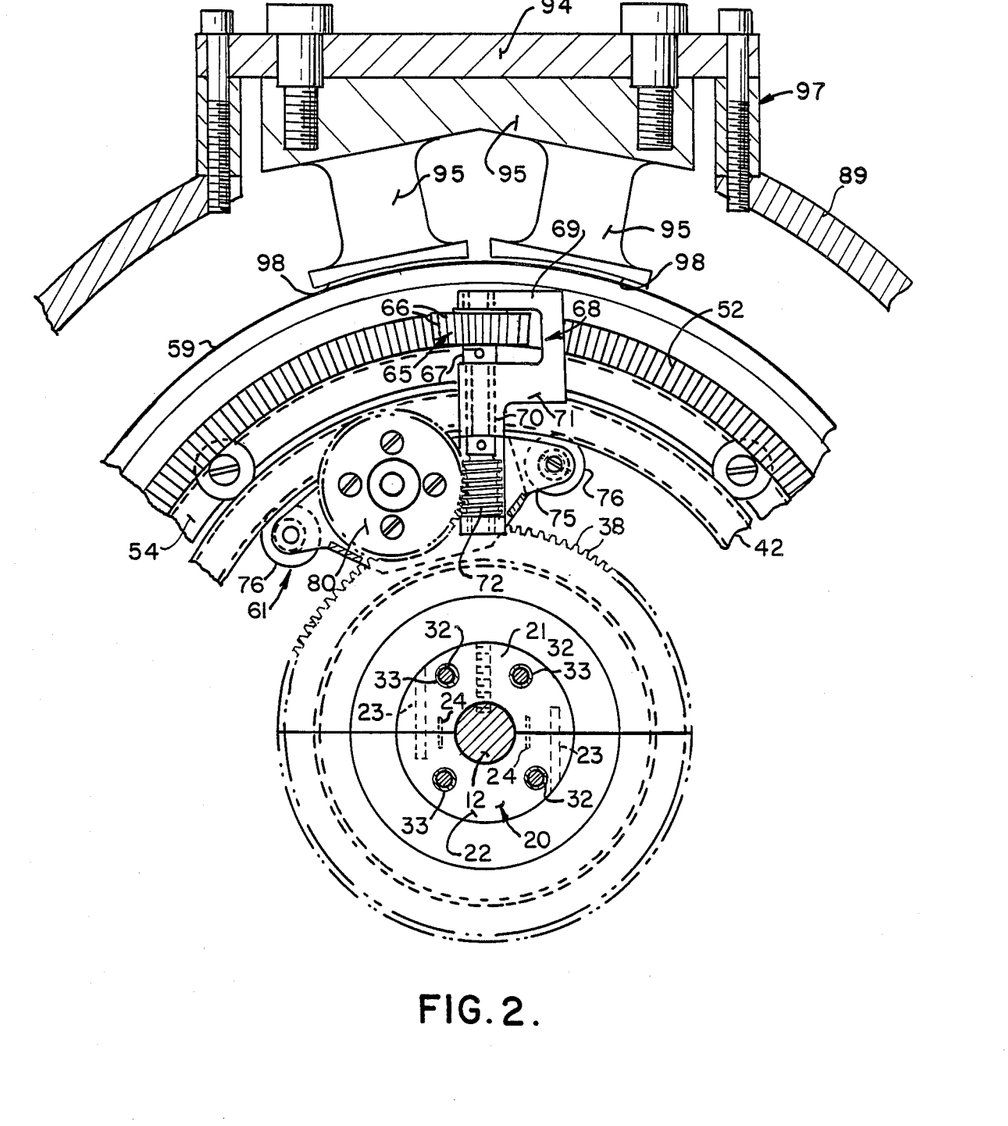
FIG. 2 is a fragmentary view, partly in section, taken transversely of the shaft on which it is mounted, of one embodiment of the mechanism of this invention.
Figure 3:
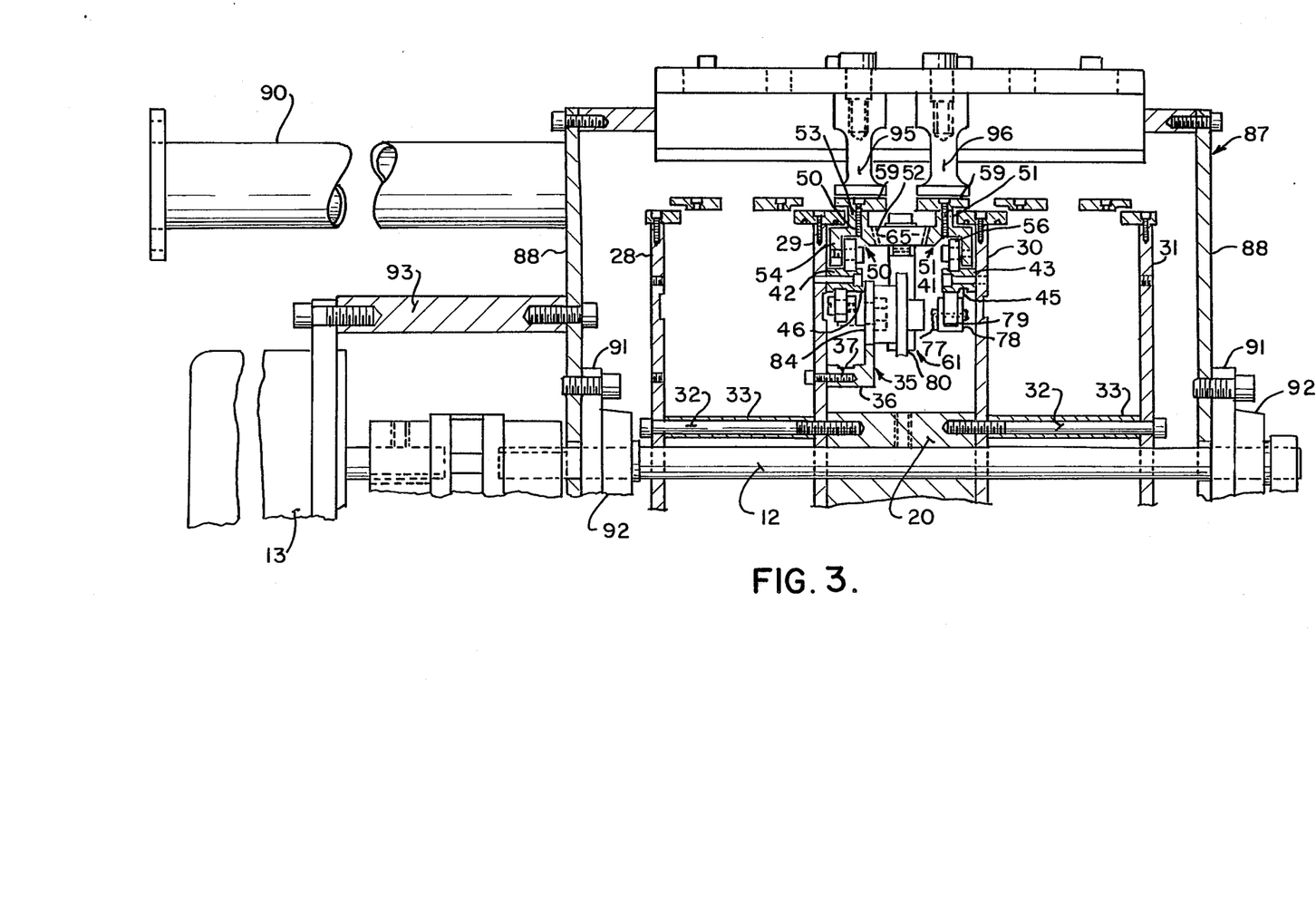
FIG. 3 is a fragmentary view, partly in section, in a direction lengthwise of the axis of rotation of the shaft, of the device shown in FIG. 2.
Figure 12:
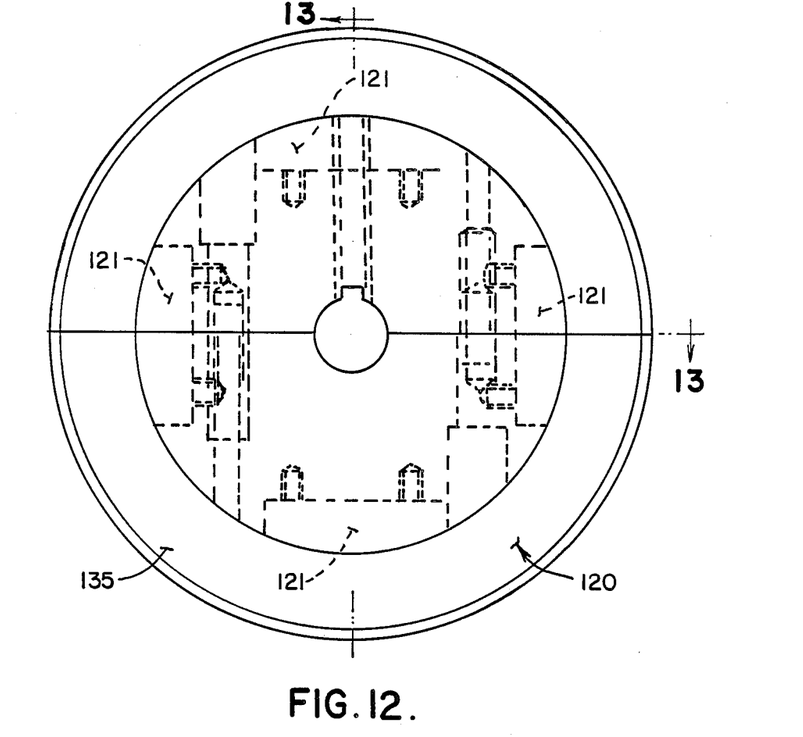
FIG. 12 is a view in side elevation of a typical hub, with integral externally toothed gear, used in certain of the embodiments of device of this invention.
Figure 13:
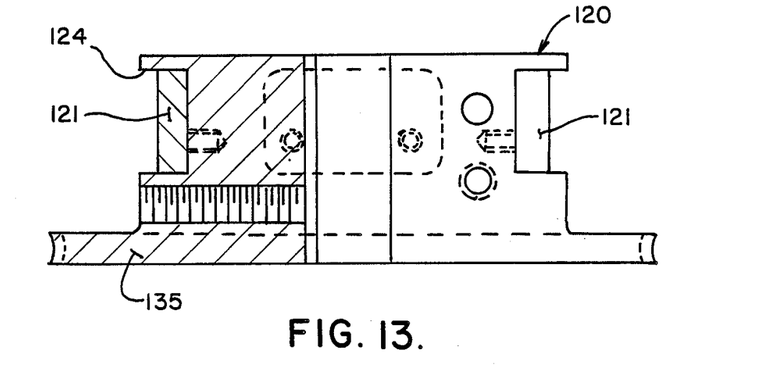
FIG. 13 a sectional view taken along the line 13—13 of FIG. 12.

Referring now to FIGS. 2 and 3 for one illustrative embodiment of mechanism, shown for illustrative purposes as being mounted on a shaft 12 of relatively small diameter driven by a motor 13. Referring now to FIG. 2, a hub 20 is mounted by means of a key and set screw, on the shaft 12. The hub 20 is a split hub with an upper half 21 and a lower half 22 joined by threaded studs 23 and dowel pins 24, hardened and ground for an interference fit with the circumferential surfaces of sockets drilled and reamed for that purpose in the diametrically flat surfaces of the halves 21 and 22. A similar hub is shown in FIGS. 12 and 13. This first embodiment, which has been proven operative but is not the preferred embodiment, is described first, because the parts of the mechanism are less compactly assembled than some of the other embodiments. In a three-unit device of this embodiment, four annular plates 28, 29, 30 and 31, are rigidly mounted on the hub 20. The plates 28 and 31 are held by long bolts 32 screwed into threaded holes in the hub 20, and sleeves 33. All of these plates, like the hub, are split diametrically to permit their being mounted intermediate the ends of the shaft 12. In FIG. 3, only one of the balancing mechanism units is shown, supported by and between plates 29 and 30, but the other two can be identical, although initially the elements that move circumferentially relative to the shaft are positioned 120° apart.

An annular spur gear 35, L shaped in cross section, as shown in FIG. 3, has teeth 38, and a gear hub 36 into which cap screws 37 extend to mount the gear to the inside surface of the plate 29. The plate 29 also carries a split bearing ring 42. A bearing ring 43, which is a mirror image of the bearing ring 42, is mounted on the inside radial flat surface of the annular plate 30. Each of the bearing rings 42 and 43 has an upper channel, a lower channel 45, and a lower bearing surface 46.

Ring gears 50 and 51, mirror images of one another, spaced from one another lengthwise of the shaft, have facing teeth 52, integral with a heavy boss section 53, and a skirt 54, dog legged in cross section as shown in FIG. 3. Anti-friction rollers 56 are mounted on an inside radially extending surface of the skirts 54 to roll freely in the upper channels of the bearing rings 42 and 43. Rims 59, also split, are mounted on the bosses 53.

In this embodiment, drive means in the form of a carriage assembly 61 constitutes the balance weight for each of the units. The carriage assembly 61 includes a pinion 65 with teeth 66 that mesh with teeth 52 of the ring gears 50 and 51. In the embodiment shown, the teeth 52, though generally radial, diverge in a radially outward direction, and the teeth 66 are beveled divergently outwardly complementarily. The pinion is fixed to a shaft 67 extending through it, the outer end of which is journaled in a bearing bushing in an outer arm 69 of a yoke 68. The yoke has a stem 70 extending radially inwardly from a lower arm 71. An inner section of the shaft 67 is journaled in a bearing bushing in the stem 70, and carries near its radially inner end a single reduction worm 72. The yoke 68 is secured to a carriage frame 75. Two rollers 76 are mounted at opposite circumferential ends of the carriage frame and roll within the channel 45 of the bearing ring 42. A bracket 77, shown only fragmentarily, is secured to the carriage 75 and carries a channel 78, in which rollers 79 are revolvably mounted to ride on the lower bearing surface 46 of the bearing ring 43. A worm gear 80, with teeth meshing with the worm 72, is mounted on the carriage. The worm gear 80 shaft turns a spur 84 which engages the teeth 38 of the hub gear 35.

In this embodiment, the entire mechanism described is enclosed in a cylindrical shell 87, with end walls 88 and circumferential wall 89. The circumferential wall 89 is interrupted to define a rectangular opening, elongated in the lengthwise direction, boxed by a frame 97, to which a support plate 94 is bolted. Pole pieces 55 and 96 are, in turn, bolted to the inner side of the support plate 94. The pole pieces have smooth under surfaces 98 positioned closely adjacent the outer surfaces of the rims 59 of the ring gears 50 and 51. As indicated diagramatically in FIG. 11, the pole pieces 95 and 96 are provided with coils by which they are energized to serve as electromagnets, and suitable electrical connections are provided therefor. However, electromagnetic pole pieces are conventional and well known in many applications, and therefore are not described in detail here.

In this particular embodiment, the shell 87 is supported by a leg 90 anchored to a suitable fixed base and brackets 91 mounted on shaft bearings 92, and a plate 93 mounted on the motor 13. The shell supports form no part of the invention and can be any suitable supports. However, like the mechanism it encloses, the shell 87 is split diametrically to permit its being mounted intermediate the ends of the shaft.

As is apparent from the drawing, the shell 87, and the pole pieces 95 and 96 are stationary. The hub 20 and plates 28, 29, 30 and 31 rotate with the shaft 12. The use of the single reduction worm 72 ensures that rotary motion about the axis of shaft 67 cannot be transmitted from the gear 35 to the pinion 65. Accordingly, because the gear 84 is meshed with the gear 35 and the drive train between the gear 84 and the pinion 65 is in effect locked, the entire drive means rotates with the shaft 12, and the ring gears 50 and 51, the teeth of which are meshed with the teeth of the pinion 65, rotate with the shaft, as well. When one of the sets of pole pieces, for example, pole pieces 95, is energized, the magnetic field set up in the pole pieces interacts with the moving rim 59, serving as an eddy current brake to slow the ring gear 50 with respect to the ring gear 51. The pinion 65 then turns, increasing the relative speed of rotation of the ring gear 51, and at the same time, turning the shaft 67 and ultimately rotating the gear 84 which meshes with the gear 35, causing the carriage frame and all of the elements mounted on it to move around the gear 35, changing its angular position with respect to the shaft 12. If the pole pieces 96 are energized while the pole pieces 95 are deenergized, the pinion will be driven in the opposite direction.

It can be seen that with three units, with the carriages positioned 120° apart initially, the shaft will be substantially balanced as far as the carriages are concerned. By moving one, two or three of them a shaft unbalance can be compensated with nicety.

Figures 10, 11:
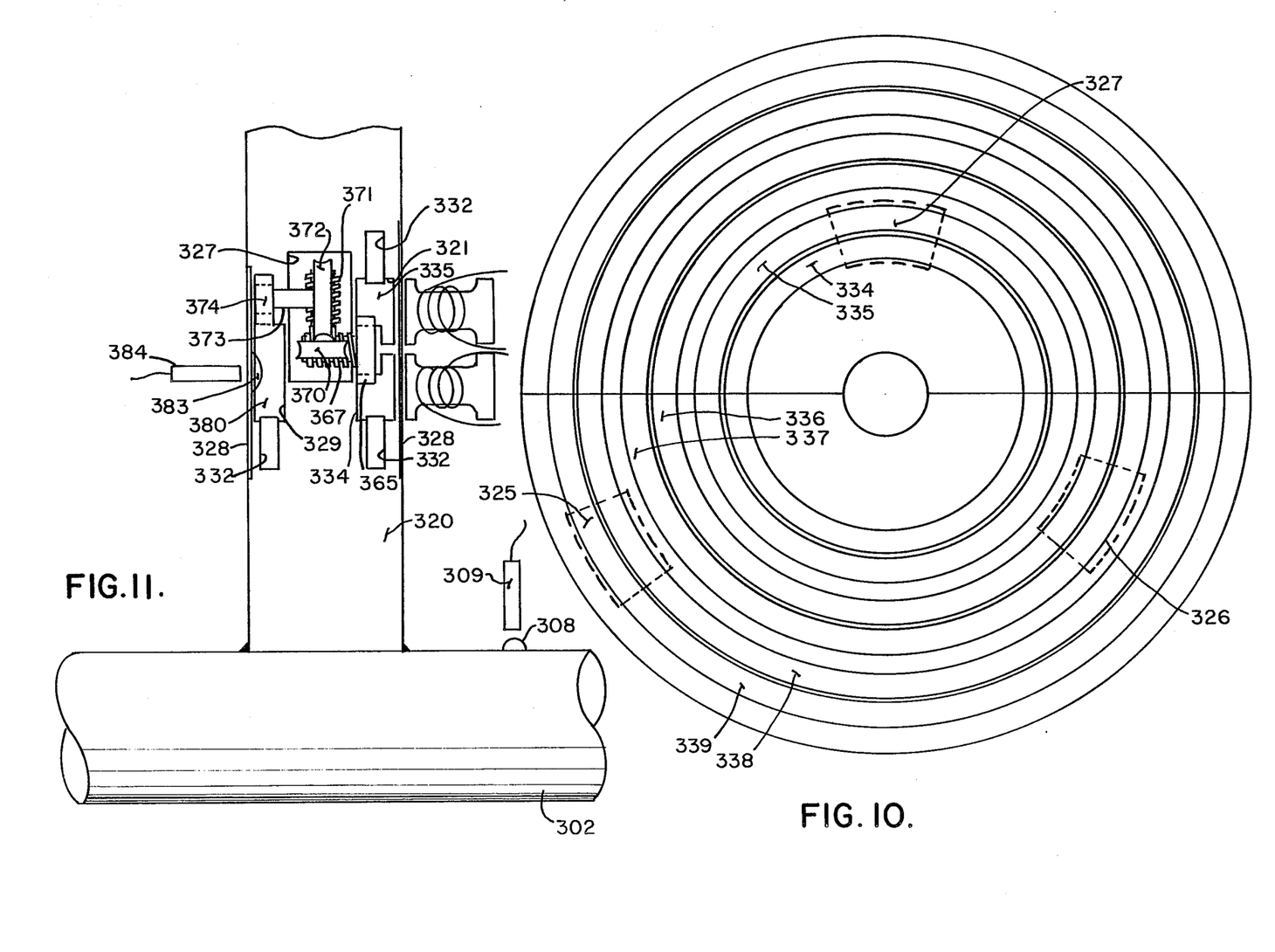
FIG. 10 is a somewhat diagramatic view in side elevation of a radially staggered three unit device embodying the principles of this invention.
FIG. 11 is a somewhat diagramatic, fragmentary view, partly in a section taken perpendicularly to FIG. 10.

As illustrated somewhat diagramatically in FIG. 11, the angular position of the shaft is commonly determined by a key phasor slot or projection and a probe which records the passage of the key phasor slot or projection. Similar slots and probes can be used to determine precisely the angular position of the carriage assemblies. For example, a probe can be positioned to record the passage of the upper end of the pinion shaft 67 past a probe. In this way, the angular relationship between the shaft and the three carriage drive assemblies can be monitored constantly.

Figure 4:
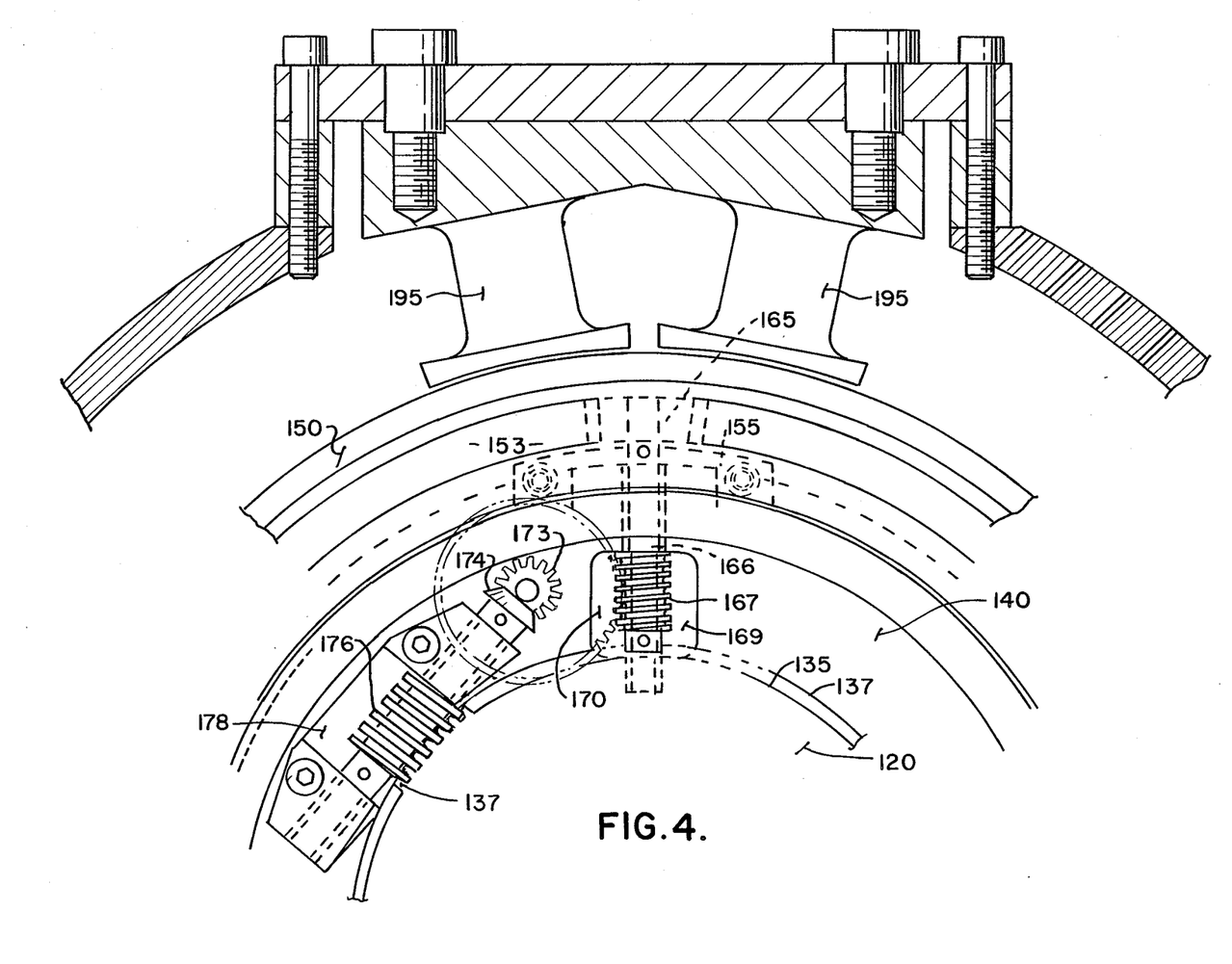
FIG. 4 is a fragmentary view, partly in section, corresponding to the view in FIG. 2, of another embodiment of the mechanism of this invention.
Figure 5:
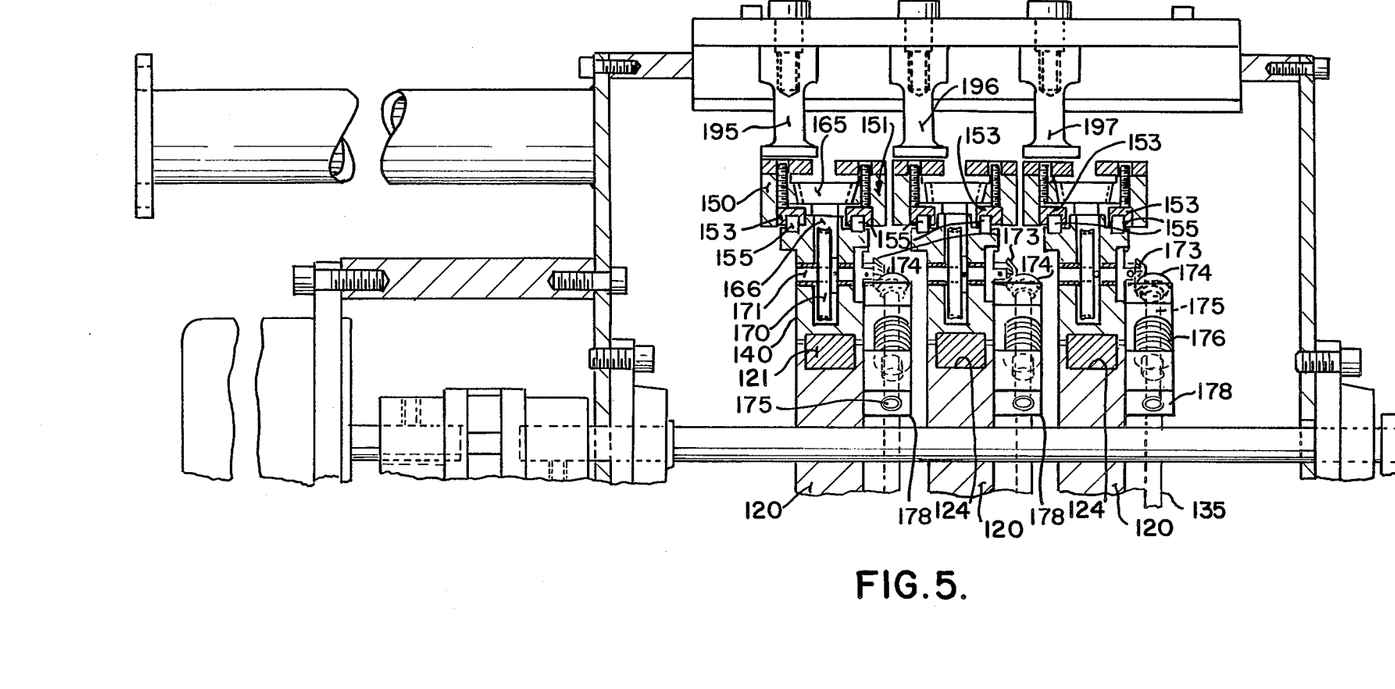
FIG. 5 is a fragmentary view, partly in section, corresponding to the view in FIG. 3, of the embodiment shown in FIG. 4.

Referring now to FIGS. 4 and 5 for a second embodiment of actuating mechanism of this invention, again for purposes of illustration, the device is mounted on a shaft 12 driven by a motor 13. The various elements of the shell in this embodiment are substantially identical to those described in connection with the first embodiment, except that, for purposes of illustration, one set of pole pieces is provided for each pair of ring gears, the pole pieces being shiftable longitudinally, individually between the two ring gears of each unit. In this embodiment, a hub 120 for each unit is mounted on the shaft 12 by means of a key and set screw. Enlarged, detailed views of the hub 120 are shown in FIGS. 12 and 13. As in the case of the hub 20 of the first embodiment, the hub 120 is split diametrically, and the two halves joined around the shaft by dowel pins and threaded studs. Merely to illustrate that various forms of bearings can be used, the hub 120 is shown as having graphite bearing inserts 121 set in a bearing channel 124. In this embodiment, a worm gear 135 is made integral with the hub 120.

Figure 6:
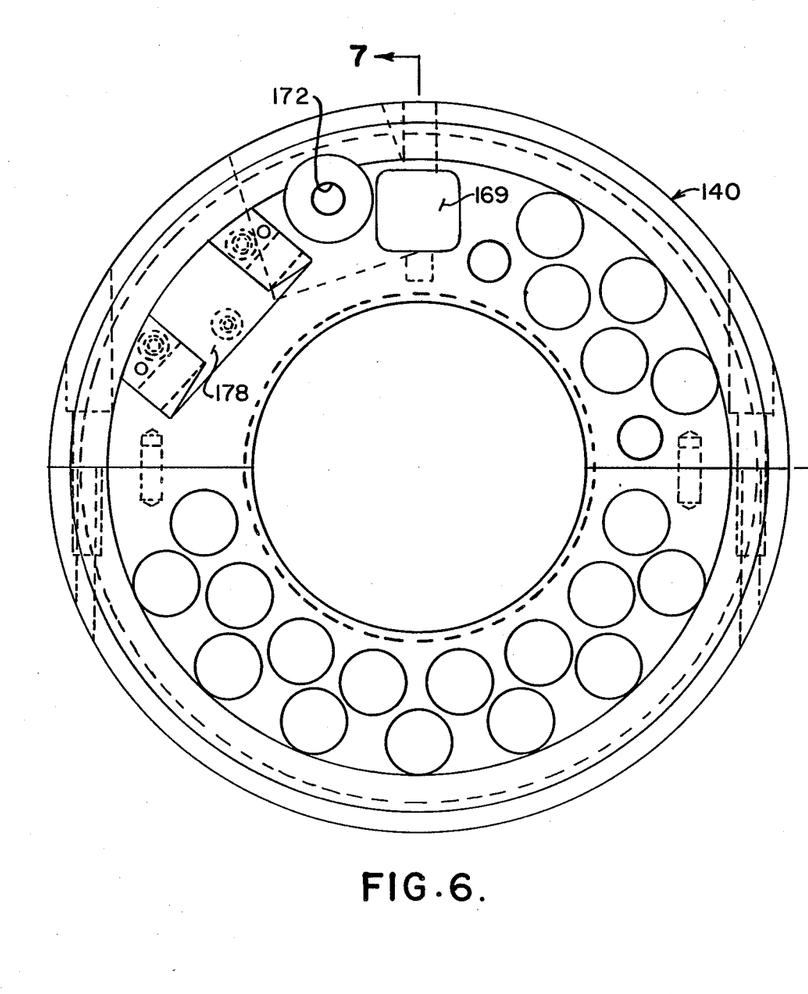
FIG. 6 is a view in side elevation of a carriage ring or imbalance means of the mechanism shown in FIGS. 4 and 5.
Figure 7:
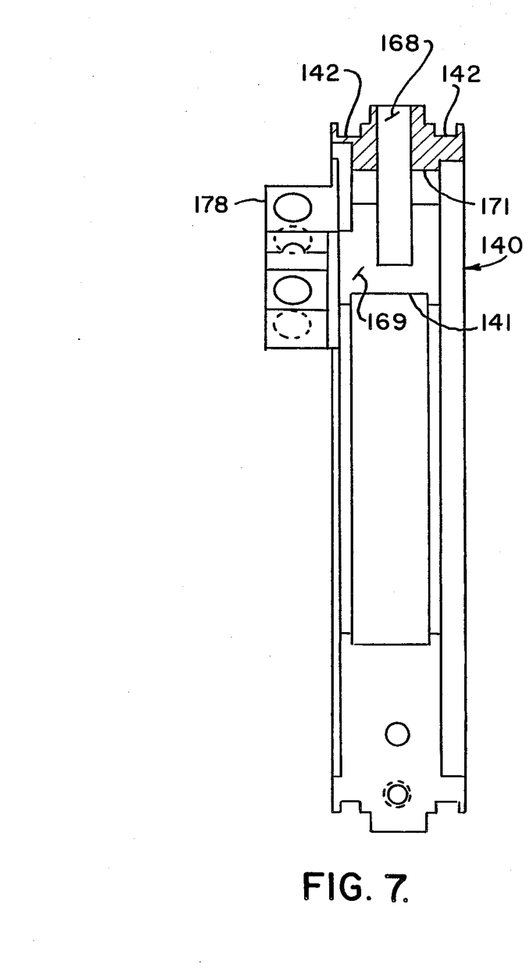
FIG. 7 is a sectional view taken along the line 7—7 of FIG. 6.

In this embodiment, the eccentricity required for adjusting the balance is provided primarily by a carriage ring 140, shown in detail in FIGS. 6 and 7. As shown particularly in FIG. 6, the carriage ring 140 is of uniform inside and outside diameter but is made with openings through it so as to make it lighter through approximately 270° than it is within the remaining 90°, as shown particularly in FIG. 6. That figure also illustrates the fact that the carriage ring is split diametrically, and the halves joined by dowel pins and threaded studs. The carriage ring 140 has a radially inwardly opening bearing channel 141, in which the graphite bearing inserts 121 ride, and, on its radially outer surface, a pair of ring gear bearing channels 142, in which graphite bearing inserts 155 are mounted, as indicated in FIGS. 4 and 5. Ring gears 150 and 151 in each unit are mounted to rotate freely on the carriage rings 140. As in the first embodiment shown and described, the ring gears 150 and 151 have facing teeth, and circumferential rims. In this embodiment, the ring gears have bearing races 153 in which the graphite inserts 155 ride.

As in the first embodiment, a pinion 165 has teeth that mesh with the facing teeth of the ring gears 150 and 151. The pinion 165 has a shaft 166 journaled in a bushing in a radial shaft passage 168 in the carriage ring 140, that leads into a well 169 in the same carriage ring. The shaft 166 carries a worm 167 that is mounted through an opening in the well 169 as seen in FIG. 4. The worm 167 engages a worm gear 170 with a shaft 171 journaled in a shaft passage 172 extending transversely through the carriage ring 140. The shaft 171 has at one end, a miter gear 173 that mates with a miter gear 174 on an end of a shaft 175 carrying a worm 176. The shaft 175 is journaled in bearings in a bearing block 178 mounted to a radial face of the carriage ring 140. The worm 176 meshes with the teeth 137 on the worm gear 135 integral with the hub 120.

In this embodiment, three sets of pole pieces 195, 196, and 197 are shown, each positioned over the rim of a ring gear 150. Either a second set of pole pieces, positioned over the rims of the ring gears 151 can be provided, or means can be provided for shifting the pole pieces selectively by individual units so, for example, as to move the pole pieces 195 over the rim of the ring gear 151 adjacent without moving pole pieces 196 and 197, or to move the pole pieces 196 and 197 or either of them, without moving the pole piece 195.

In the operation of the embodiments just described, the energization of any one of the pole pieces will slow the rotation of the rim of the ring gear immediately inboard of it, to cause the pinion 165 to rotate, causing the worm gear 170, miter gears 173 and 174 and worm 176 to rotate, moving the carriage ring 140 circumferentially. Because the carriage ring 140 is unbalanced, its movement around the hub 120 will shift the unbalance of the ring to counterbalance the shaft, as described in connection with the embodiment shown in FIGS. 2 and 3.

Figure 8:
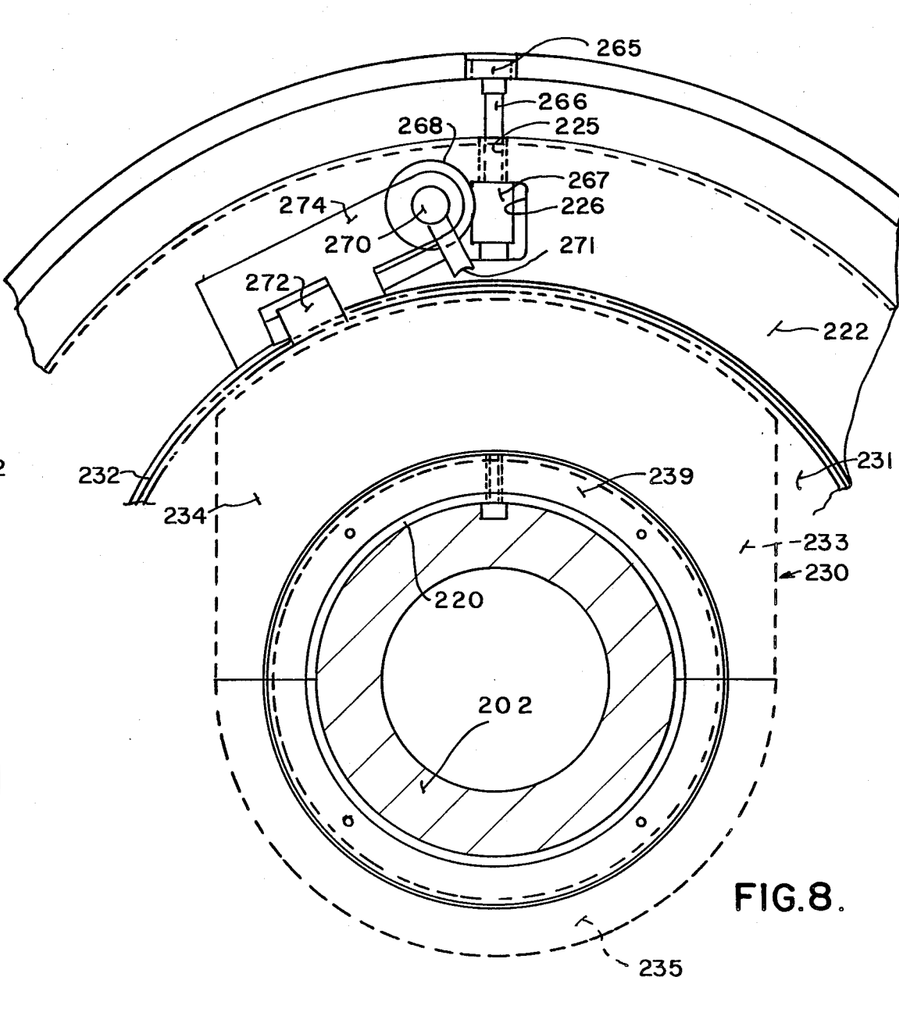
FIG. 8 is a fragmentary, somewhat diagramatic view corresponding to the view of FIGS. 2 and 4 of still another embodiment of the invention.
Figure 9:
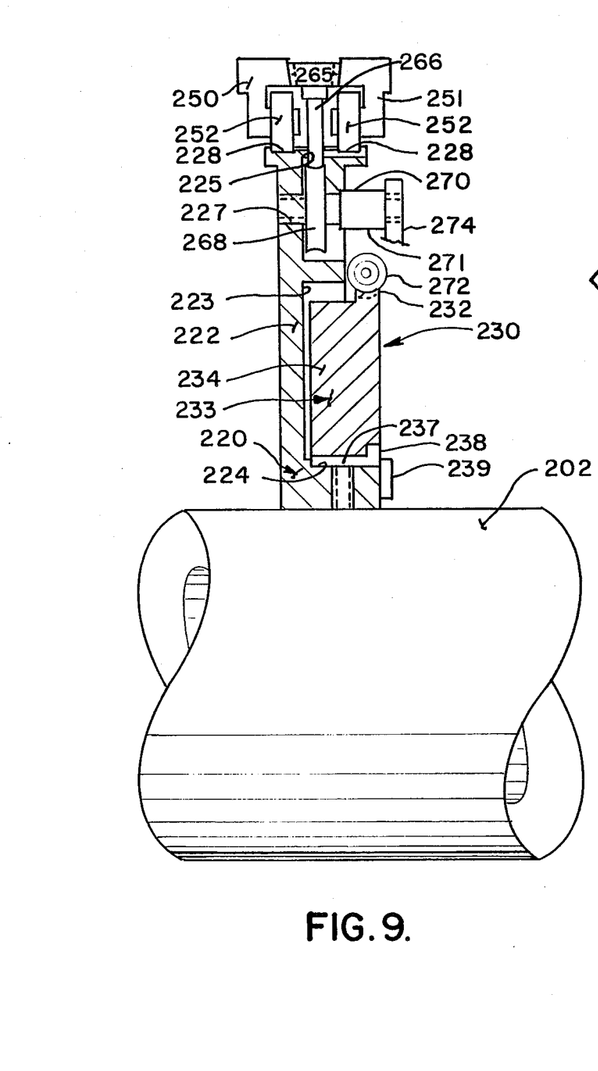
FIG. 9 is a somewhat diagramatic view, partly broken away, perpendicular to the view shown in FIG. 8, of the device shown in FIG. 8.

Referring now to FIGS. 8 and 9 for a third embodiment, reference numeral 202 indicates a shaft more nearly the size of the shaft 2 indicated in FIG. 1. A hub 220 is mounted on the shaft 202 by one or more keys and set screws. In this embodiment, the hub has, integral with it, a radially extending plate section 222 with a counter-weight channel 223. The radially inboard wall of the counter-weight channel has in it a step 224. Radially outboard of the counter-weight channel, the plate 222 has a pinion shaft journal 225, a worm gear cavity 226, and a worm gear shaft journal 227. On its radially outboard edge, the plate 222 has ring gear races 228. In this embodiment, a counter-weight assembly 230, which, like the hub, is split diametrically and its two parts connected by dowel pins and threaded studs, includes a worm gear 231, circular in elevation, with teeth 232, and, integral with the worm gear 231, a counter-weight 233. The counter-weight 233 has, in its assembled condition, a uniformly circular cylindrical inside surface, stepped at its laterally out side edge to receive a flange 238 of a bronze bearing ring 237 seated in the step 224 and retained by a retaining ring 239, all shown in FIG. 9. As has been indicated, the worm gear portion 231 of the counter-weight has a uniform outside diameter. Accordingly, the part of the counter-weight 233 shown in FIG. 9 and indicated in dotted lines in FIG. 6, has a heavy section 234 extending radially to a place close to the teeth 232 of the worm gear 231, and a relatively light, circular section 235 extending radially outwardly only a relatively short distance in the direction of the teeth 232.

In this embodiment, ring gears 250 and 251, which, like the ring gears of all of the embodiments, are split diametrically, are shown as mounted on ball bearing rollers 252 riding in the channels 228 of the hub plate 222. A pinion 265 with a pinion shaft 266 carrying a worm 267 engages the facing teeth of the ring gears 250 and 251, as in the other embodiment. The worm 267 engages a worm gear 268, a shaft 269 of which carries a worm 270. The worm 270 engages a worm gear 271 that drives a worm 272 that meshes with the teeth 232 of the worm gear 231 of the counter-weight assembly 230. The pinion 265 and all of the drive train between the pinion and the gear 232 are mounted in and on the hub plate 222, part of it being supported by a bearing block 274 mounted on a radial surface of the hub plate. The pinion and drive train are therefore fixed with respect to the hub and the shaft, and serve to rotate the counter-weight mechanism relative to the shaft. As in the other embodiments, a plurality of sets of the balance mechanism can be provided, in any desired number. Three units have been shown or indicated in the embodiments heretofore described, because that number has been found to provide fine control. However, one, two or four or more units could be employed. As in the other embodiments, means are provided for slowing one or the other of the ring gears 250 and 251. Those means can take forms different from the pole pieces shown and described. For example, cup shaped indentations or cavities can be made in the outside surface of the rims of the ring gears, and jets of air arranged to impinge upon them without mechanically engaging the ring gears and without exposing the mechanism to ambient dust and dirt. Other kinds of brakes or clutches, such as caliper brakes or shoes or straps can also be employed, although they are more difficult to enclose, and may generate dust or debris.

Referring now to FIGS. 10 and 11 for yet another embodiment of this invention, reference numeral 302 indicates a shaft, on which a key phasor 308 is shown somewhat diagramatically. A key phasor probe 309 registers a pulse every time the key phasor 308 passes it. The pulse detection, storage or processing and display are conventional.

In this embodiment of balancing mechanism, a hub-disc 320 is secured to the shaft. The hub-disc has three concentric ring gear channels 321 extending axially inboardly from one radially extending side, and three concentric counter-weight channels 329 on the other radially extending side of the hub-disc 320. All of the channels have bearing seats 332 in them. In this embodiment, three gear train pockets 325, 326 and 327 are provided in the hub-disc, spaced radially from one another in approximately the center of three ring gear channels, and spaced angularly 120° apart, as shown in FIG. 10. The ring gear channels, gear train pockets and counter-weight channels are shown as covered with transparent covers 328.

In this embodiment, ring gears 334, 335, 336, 337, 338 and 339 are arranged concentrically and journaled in the ring gear channels 321. Teeth of each pair of ring gears mesh with a pinion 365 driving a worm 367 the teeth of which mesh with a worm gear 370 driving a worm 371 meshing with teeth of a worm gear 372 with a shaft 373 on which a output pinion 374 is mounted to mesh with teeth on a radially outboard surface of a counter-weight ring 380 journaled for rotation in the counter-weight ring channel 329 in the hub 320. As shown somewhat diagramatically in FIG. 11, each of the counter-weight rings 380 has in it a key phasor slot 383 with an associated key phasor probe 384. In this embodiment, the counter weight rings are driven with respect to the shaft, and, as in the embodiment shown in FIGS. 8 and 9, the pinion and power train remain fixed angularly with respect to the hub and shaft. The counter-weight rings 380 are unbalanced, as by having holes through portions of them, and are graduated in weight, the heaviest being of the smallest diameter, and the lightest, of the largest diameter. Their weights are preferrably adjusted so that the product of the effective radius and the weight of each of them is the same as the product of their radii and weights of the others. The gear ratios of the power trains driving the three counter-weight rings can also be calculated to produce the same rates of angular movement in degrees or radians. However, because of the ready location of the key phasor slot 383 with respect to the reference key phasor 308 on the shaft, the rate of rotation of the counter-weight ring is not of critical importance, as long as it is slow enough to be controllable with nicety.

Figure 14:
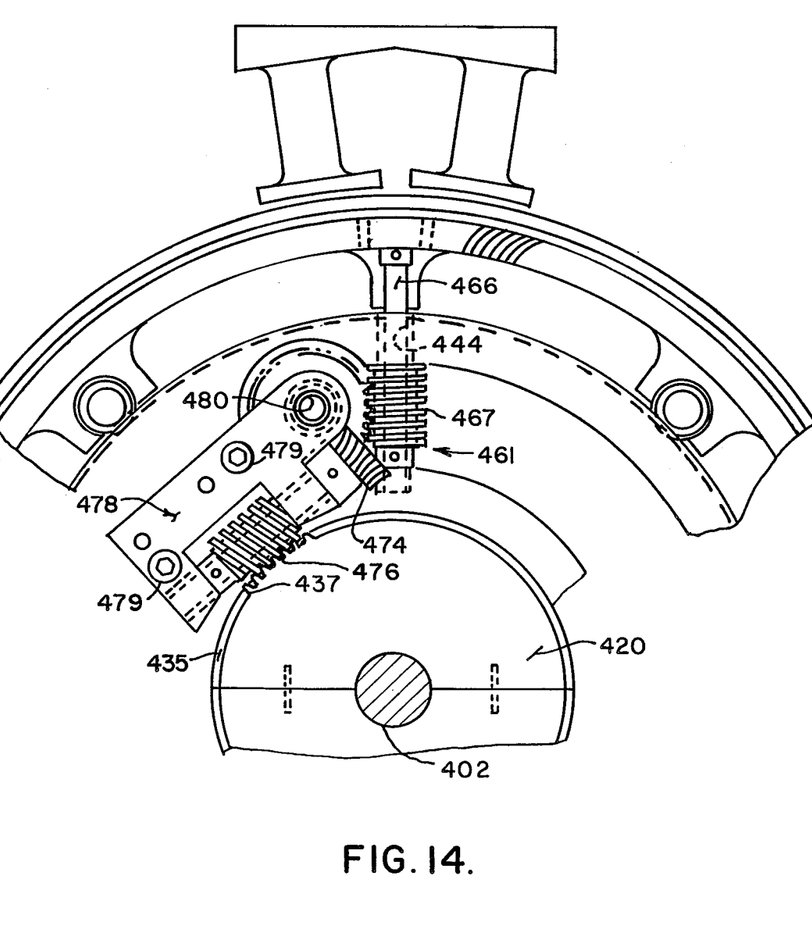
FIG. 14 is a fragmentary view, partly in section, corresponding to the view in FIGS. 2, 4 and 8 of still another embodiment of this invention.
Figure 15:
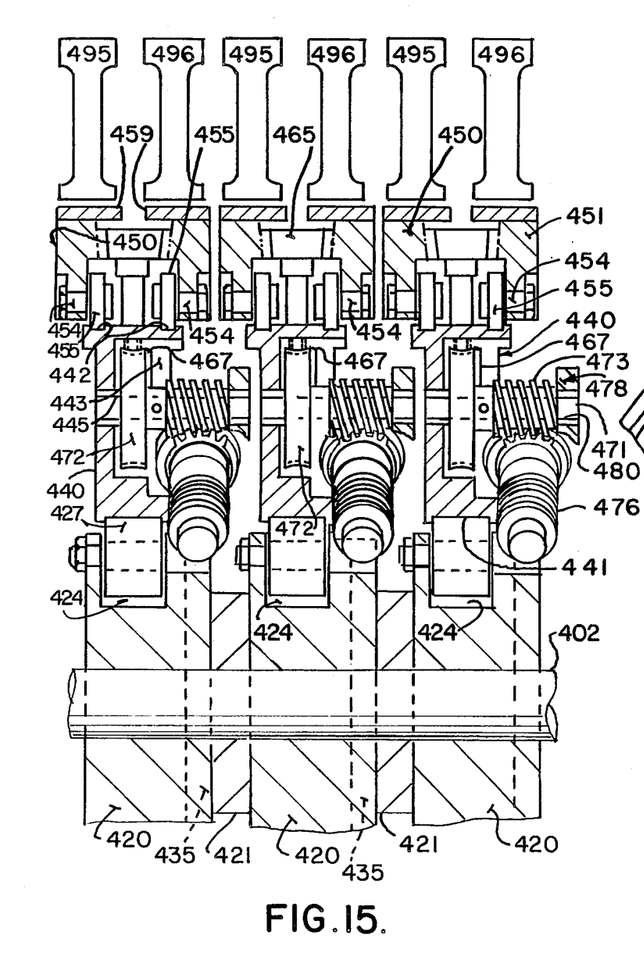
FIG. 15 is a fragmentary view, partly in section, corresponding to the view in FIGS. 3, 5 and 9 of the device shown in FIG. 14.

Referring now to FIGS. 14 and 15 for what is considered to be the preferred embodiment, which most closely resembles the embodiment shown in FIGS. 4 and 5 heretofore described, reference numeral 402 indicates a shaft on which hubs 420 are mounted. Three hubs 420, identical with one another, are shown as spaced apart axially by spacers 421. Each of the hubs 420 is circular in side elevation, as suggested in FIG. 14, and has bearing pockets 424 spaced circumferentially around it. The bearing pockets 424 are offset from the transverse center line of the hub from a worm gear 435, which, like the worm gear 435 of the earlier embodiment, is integral with the hub 420, and has teeth 437. Antifriction bearing rollers 427 carried on shafts mounted in the hub 420 in the channels 424, project radially outwardly from the channel 424.

A carriage ring 440, which can be of the same general character as the carriage ring 140 illustrated in FIGS. 6 and 7, is mounted on each of the hubs 420. Each carriage ring 440 has an inner channel 441 to receive the rollers 427, and outer channels 442, a drive train cavity 443, a pinion shaft journal passage 444 extending radially, and a worm gear shaft journal 445 opening into the cavity 443 from a radial side wall. Ring gears 450 and 451 are revolvably mounted on the carriage ring 440 by antifriction wheels 455, mounted on wheel shafts 454, and running in the outer channels 442 of the carriage ring. Each of the ring gears has a rim 459 mounted on it.

A carriage drive assembly 461 in this embodiment includes a pinion 465, with a pinion shaft 466 journaled in the pinion shaft journal 444. A pinion worm 467, mounted on the pinion shaft 466 meshes with a worm gear 472 mounted on a shaft 471 journaled at one end in the ring journal 445, and at its other end in a bearing 480 in a bearing block 478. The bearing block 478 is mounted to the carriage ring 440 by means of cap screws 479. The worm 473 engages a worm gear 474 mounted at one end of a shaft journaled in bearings carried by the bearing block 478. A worm 476, mounted on the shaft, engages the teeth 437 of the worm gear 435.

Pole pieces 495 and 496 are positioned closely adjacent the rims 459, either within an enclosure or immediately outside a cylindrical thin enclosure of non-magnetic material such, for example, as a suitable plastic.

The operation of the embodiment shown in FIGS. 14 and 15 is substantially the same as the operation of the embodiment shown in FIGS. 4 and 5. In that embodiment, as in the embodiment shown in FIGS. 14 and 15, the carriage drive assemblies are shown as aligned circumferentially. This is merely for illustration. Ordinarily, they would be positioned initially at 120° from one another in a three-unit mechanism.

Numerous variations in the construction of the mechanism of this invention, within the scope of the appended claims, will occur to those skilled in the art in the light of the foregoing disclosure. Merely by way of example, as has been suggested, different means can be employed to slow down one or the other of the ring gears. The drive train from the pinion can be used to move actuating devices chordally, radially, or axially. The available drive can be used to vary the pitch of blades, for example. Important aspects of the invention include the provision of ring gears and one or more pinions, which permits the generation of force through a power train without an physical contact with any part of the apparatus and the complete enclosure of the apparatus, and the splitting of all of the parts surrounding a shaft so as to permit the installation of the device intermediate the ends of a shaft without access to an end of the shaft. As has been indicated, the shaft itself need not be slowed or operated in any different way to permit the apparatus of this invention to operate. The power required to move the ring gears, hence the unbalance means, is negligable in the application for which the mechanism is intended. It is not necessary to stop the ring gears or one of them; it is necessary only to obtain a speed differential between the rotating speed of the ring gears and the base shaft to cause the pinion to rotate.

As can readily be appreciated, control apparatus can be provided of any desired level of sophistication. It may be sufficient for a particular application to provide switches and rheostats for manual operation of the pole pieces shown and described in some of the embodiments. It may be desired to automate the control using a computer to interpret the vibratory data from a set of sensors and to control the application of braking action to the appropriate ring gears so as to minimize the vibrations of the rotating shaft assembly or to develop vibrations of some specific amplitude or varying amplitude as a function of time or operating conditions. In any event, the system of key phasor detection referred to heretofore provides precise angular location of each unbalanced disc or carriage relative to the shaft. Other position detecting devices can be employed, such as optical sensors. The use of the single reduction worms in the drive train, to prevent rotation of the pinion by the drive train, affords a simple and effective solution to the problem, because the drive train must be adapted to transmit motion in either direction of rotation of the pinion. However, other systems of gearing might be used. In every embodiment, the entire driving mechanism, from the ring gears to the unbalance means is carried by the hub. The support means for the various elements rotating about the shaft and hub have been shown as taking various forms, from graphite inserts to rollers. Other support means can be employed as long as they permit the ring gears and the unbalance means to move freely. The amount of reduction between the rotation of the pinion and the rotation of the gears ultimately driving the unbalance means can readily be varied, the greater the reduction, the greater the nicety with which the unbalance means can be positioned, but the slower the movement of the unbalance means. In the embodiment shown in FIGS. 10 and 11, annular retaining rings can be used to facilitate installation of the drive mechanism and support means. It can be seen that a single mechanism can be employed, even in a balancing mechanism, if a counter-weight to the unbalance means is fixed with respect to the shaft. However, as has been indicated, at least two, and preferably three or four units provide more versatility and nicety of operation. These auxiliaries and variations are merely illustrative.

We claim:

1. A balancing mechanism installed intermediate the ends of a shaft and operative while said shaft is rotating to correct dynamic unbalance in a machine with which said rotates comprising a split hub mounted on and around said shaft intermediate the ends thereof, at least one unbalance means carried by said hub, drive means operatively connected to said unbalance means for selectively moving said unbalance means with respect to said shaft, said drive means comprising split ring gears concentric with said shaft and rotatably supported by support means, pairs of said ring gears having teeth on generally radially extending surfaces, the gears of each pair being spaced apart and the teeth thereof facing one another, pinion means mounted for rotation by and between said gears and having teeth meshing with said ring gear teeth, power train operatively connecting said pinion means to said unbalance means to move said unbalance means in either of two directions, depending upon the direction of rotation of said pinion means, means for preventing rotation of said pinion means by said power train, and retarding means for selectively slowing one or the other of the said ring gears of said pair with respect to the other of said ring gears to cause said pinion means to rotate.

2. The mechanism of claim 1 wherein a plurality of unbalance means and associated drive means are provided.

3. The mechanism of claim 2 wherein at least three unbalance means and associated drive means are provided.

4. The mechanism of claim 2 wherein said unbalance means are arranged successively outwardly radially and said drive means comprise concentric ring gears.

5. The mechanism of claim 1 wherein the unbalance means comprises a carriage moveable along a fixed track carried by said hub.

6. The mechanism of claim 1 wherein the unbalance means comprises a ring with a weight distribution asymmetrical with respect to the axis of rotation of said shaft.

7. The mechanism of claim 6 wherein the said pinion means and power train are mounted directly on and carried by said hub and include a toothed member revolvably driven by said pinion means and an externally toothed gear fixed to said ring, teeth of said toothed member and said unbalance means gear meshing to cause rotation of said unbalance ring when said pinion means is rotated.

8. The mechanism of claim 6 wherein the said pinion means and power train are mounted directly on and carried by said ring and said power train includes a toothed member revolvably driven by said pinion means and an externally toothed gear fixed to said hub, teeth of said toothed member and said hub gear meshing to cause rotation of said ring when said pinion means is rotated.

9. The mechanism of claim 8 wherein the hub gear is a worm gear and the drive train includes a worm rotated directly by said pinion means, a worm gear driven directly by said pinion means worm and a worm operatively connected with said worm gear and engaging the hub worm gear.

10. The mechanism of claim 1 wherein said retarding means comprises electromagnetic means spaced radially outboardly from said ring gears, which, when energized, acts as an eddy-current brake with a selected one ring gear of said pair of ring gears.

11. The mechanism of claim 1 including locating means for determining the location of said unbalance means relative to a point on said shaft.

12. The mechanism of claim 1 wherein said power train means includes a plurality of worms and worm gears, driven by said pinion means, one of said worms engaging teeth to drive said unbalance means, at least one of said worms comprising said means for preventing rotation of said pinion means by said power train.

13. The mechanism of claim 1 including support means carried by said hub and carrying said unbalance means.

14. The mechanism of claim 13 wherein said support means comprises bearing means.

15. The mechanism of claim 1 wherein the hub carries an externally toothed gear, the power train includes a toothed member rotated by the pinion means and meshing with said hub gear, and said power train and pinion means constitute the unbalance means.

16. An actuating mechanism installed intermediate the ends of a shaft and operative to perform a function requiring motion while the shaft is rotating, comprising a split hub mounted on and around said shaft intermediate the ends thereof, actuating means carried by said hub, and drive means operatively connected to said actuating means for selectively moving said actuating means with respect to said shaft, said drive means comprising ring gears concentric with said shaft and rotatably supported by said hub, pairs of said ring gears having teeth on generally radially extending surfaces, the gears of each pair being space apart and the teeth thereof facing one another, pinion means mounted for rotation by and between said gears and having teeth meshing with said ring gear teeth, power train means operatively connecting said pinion means to said actuating means to move said actuating means in either of two directions, depending upon the direction of rotation of said pinion means, means for preventing rotation of said pinion means by said power train, and retarding means for selectively slowing one of said ring gears of said pair with respect to the other of said ring gears to cause said pinion means to rotate.

* * * * *